(12) United States Patent
Dornseif et al.

(10) Patent No.: US 9,709,342 B2
(45) Date of Patent: Jul. 18, 2017

(54) HEAT EXCHANGER ARRANGEMENT IN A HOUSING

(71) Applicant: Modine Manufacturing Company, Racine, WI (US)

(72) Inventors: Marius Dornseif, Filderstadt (DE); Klaus Kalbacher, Rangendingen (DE); Rainer Glück, Tübingen (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 14/176,412

(22) Filed: Feb. 10, 2014

(65) Prior Publication Data

US 2014/0224458 A1    Aug. 14, 2014

(30) Foreign Application Priority Data

Feb. 13, 2013    (DE) .................. 10 2013 002 478
Feb. 13, 2013    (DE) .................. 10 2013 002 523

(51) Int. Cl.
*F28D 7/00*    (2006.01)
*F28D 7/10*    (2006.01)
(Continued)

(52) U.S. Cl.
CPC ............ *F28F 9/02* (2013.01); *F02B 29/0462* (2013.01); *F28D 9/0056* (2013.01); *F28F 9/001* (2013.01);
(Continued)

(58) Field of Classification Search
CPC ...... F28F 9/02; F28F 9/00; F28F 9/001; F28F 9/002; F28F 9/005; F28F 9/007;
(Continued)

(56) References Cited

U.S. PATENT DOCUMENTS 3,628,603 A    12/1971    Fieni
6,315,257 B1 *  11/2001    Fennesz .................. 248/232
(Continued)

FOREIGN PATENT DOCUMENTS

DE          19853455 A1    6/1999
DE    WO 2012150358 A1 *  11/2012 ............ F02B 29/045
(Continued)

OTHER PUBLICATIONS

First Office Action from the State Intellectual Property Office of China for Application No. 201410049599.8 dated Jan. 24, 2017 (16 pages).

*Primary Examiner* — Frantz Jules
*Assistant Examiner* — Steve Tanenbaum
(74) *Attorney, Agent, or Firm* — Michael Best & Friedrich LLP

(57) ABSTRACT

A heat exchanger arrangement in a housing, such as an intake pipe of an internal combustion engine, has at least one stack including tubes and fins and an end plate having media connections, and wherein the stack is inserted into the housing and is fastened therein. A connecting block which contains the media connections and/or at least one profiled rail is arranged on the end plate. The housing has at least one cross-section-expanding wall graduation and/or at least one receptacle integrated into the housing wall, wherein the connecting block sits in the cross-section expansion and/or a cross section of the receptacle corresponds approximately to a cross section of the rail.

26 Claims, 8 Drawing Sheets

(51) Int. Cl.
*F28F 9/02* (2006.01)
*F02B 29/04* (2006.01)
*F28F 9/00* (2006.01)
*F28F 9/007* (2006.01)
*F28D 9/00* (2006.01)
*F28F 9/013* (2006.01)
*F28D 7/16* (2006.01)
*F28D 21/00* (2006.01)

(52) U.S. Cl.
CPC .......... *F28F 9/0075* (2013.01); *F28F 9/0253* (2013.01); *F28D 7/1692* (2013.01); *F28D 2021/0082* (2013.01); *F28F 9/013* (2013.01); *F28F 2275/14* (2013.01); *Y02T 10/146* (2013.01)

(58) Field of Classification Search
CPC .. F28F 9/0075; F28F 2225/02; F28F 2280/06; F28F 2275/14; F28F 9/0246; F28F 9/0248; F28F 9/0251; F28F 9/0253; F28F 9/0256; F28F 9/04; F28F 2275/00; F28F 9/12; F28F 9/14; F01P 11/10; F24F 13/20; F24F 2013/202; F28D 9/0031; F28D 9/0043; F28D 9/0056; B23P 15/26
USPC .......................................... 165/162, 157–160
See application file for complete search history.

(56) References Cited

U.S. PATENT DOCUMENTS

| | | | |
|---|---|---|---|
| 6,470,961 B1 | 10/2002 | Case | |
| 6,923,020 B2* | 8/2005 | Choi | 62/515 |
| 7,617,865 B2 | 11/2009 | Bazika | |
| 7,841,384 B2 | 11/2010 | Vincent et al. | |
| 8,016,025 B2* | 9/2011 | Brost | F02B 29/0462 165/149 |
| 2005/0061026 A1 | 3/2005 | Choi | |
| 2006/0278377 A1* | 12/2006 | Martins | F02B 29/0412 165/140 |
| 2007/0175617 A1 | 8/2007 | Brost et al. | |
| 2009/0013710 A1* | 1/2009 | Cho | F25D 23/062 62/285 |
| 2009/0014153 A1* | 1/2009 | Pimentel | F02B 29/0462 165/67 |
| 2009/0260775 A1* | 10/2009 | Maucher | F01N 5/02 165/41 |
| 2011/0005719 A1 | 1/2011 | Seto et al. | |
| 2012/0210986 A1* | 8/2012 | Ghiani | 123/542 |
| 2012/0285423 A1 | 11/2012 | Nguyen | |
| 2013/0168048 A1 | 7/2013 | Velte et al. | |
| 2014/0000569 A1 | 1/2014 | Eilemann et al. | |
| 2014/0130764 A1* | 5/2014 | Saumweber | F02B 29/045 123/184.21 |

FOREIGN PATENT DOCUMENTS

| | | | |
|---|---|---|---|
| DE | 102013202118 A1 | 8/2014 | |
| FR | WO 2012059152 A1 * | 5/2012 | ............ F28F 9/0253 |
| GB | 2189589 | 10/1987 | |
| GB | 2189589 A | 10/1987 | |
| WO | 2010108992 A1 | 9/2010 | |
| WO | 2010146063 | 12/2010 | |
| WO | 2010146063 A1 | 12/2010 | |
| WO | 2011009412 A1 | 1/2011 | |
| WO | WO 2012007133 A1 * | 1/2012 | |
| WO | WO 2012059152 A1 * | 5/2012 | ............ F28F 9/0253 |
| WO | WO 2012/085008 * | 6/2012 | |
| WO | WO 2012085008 A1 * | 6/2012 | |

\* cited by examiner

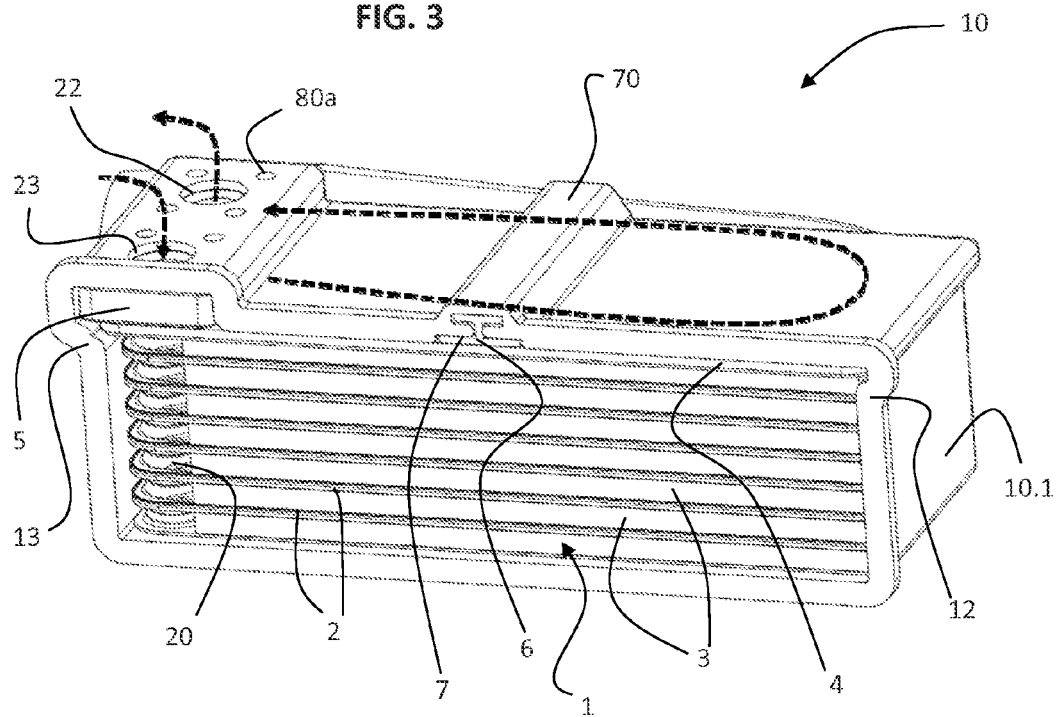
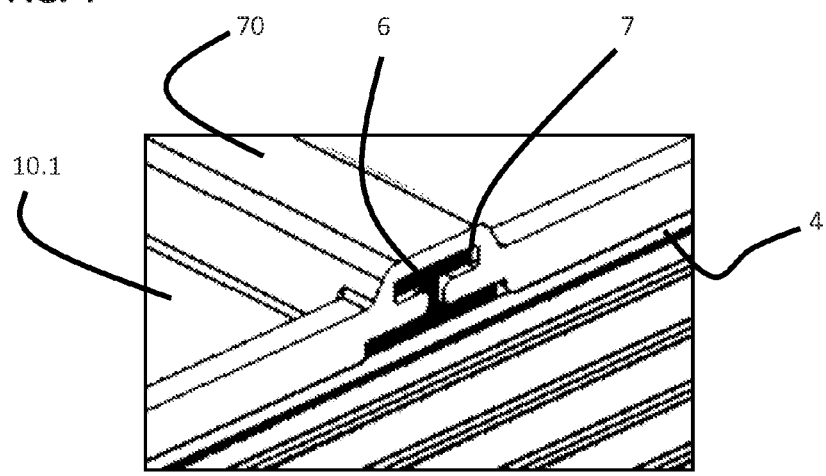

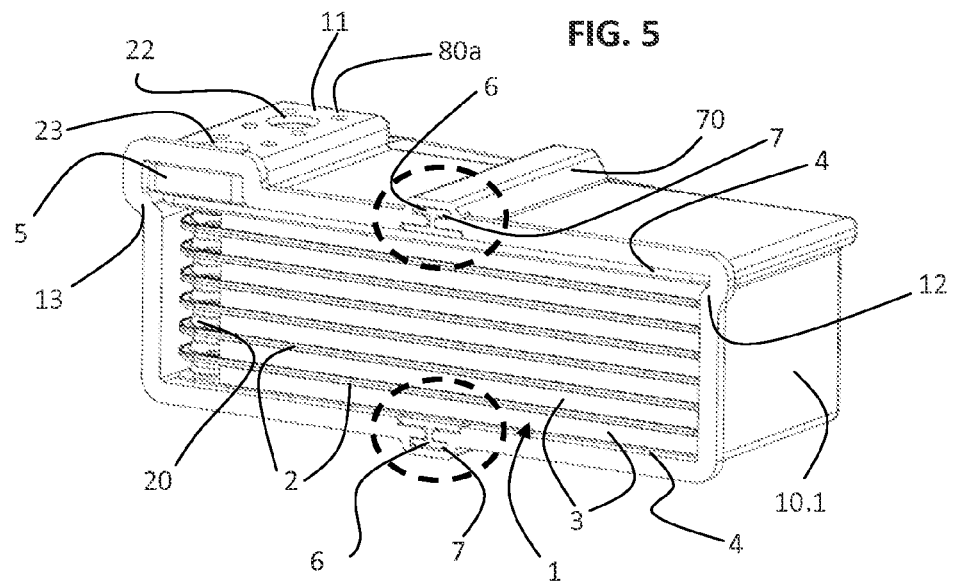
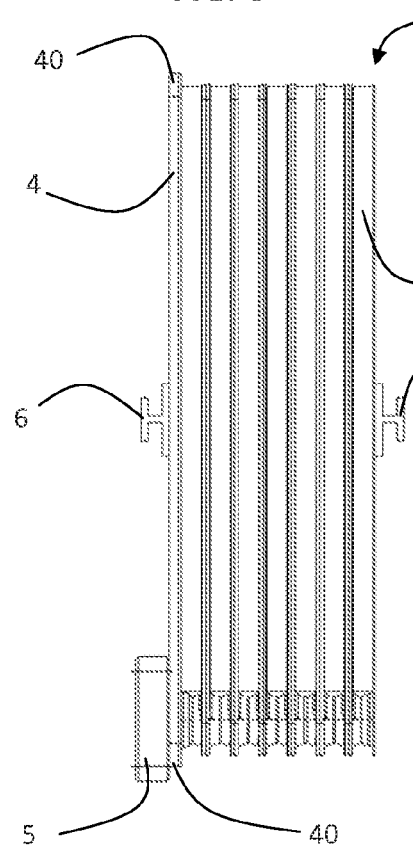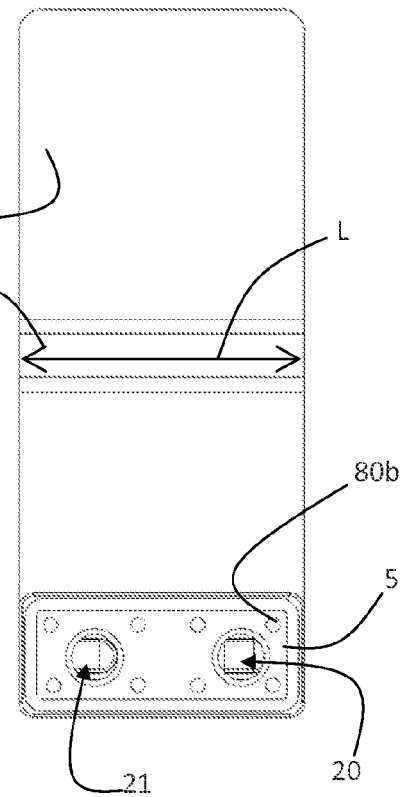

HEAT EXCHANGER ARRANGEMENT IN A HOUSING

CROSS REFERENCE TO RELATED APPLICATIONS

This application claims priority to German Patent Application No. 102013002478.1 filed Feb. 13, 2013 and German Patent Application No. 102013002523.0, filed Feb. 13, 2013, the entire contents of which are hereby incorporated by reference herein.

BACKGROUND

The invention relates to a heat exchanger arrangement in a housing, such as an intake pipe of an internal combustion engine, wherein the heat exchanger has at least one stack consisting of tubes and fins, and an end plate which can have fluid passages, and wherein the stack is inserted into the housing and is fastened therein.

Such a heat exchanger arrangement is revealed, for example, in EP 1 785 609 A1 and also in EP 1 830 048 A1. It involves indirect charge-air coolers with which the charge air, or else a mixture of charge air and an exhaust gas flow to be conducted back to the internal combustion engine, is cooled with a liquid coolant. In these references, the stack has an end plate projecting around and above the contour of the stack and is inserted into an opening in the housing from above. The fastening takes place at the opening edge of the housing and at the projecting edge of the end plate by means of screw connections or the like.

WO 2012/085008 A1 relates to a heat exchanger arrangement in a housing and has a stack of tubes and fins, as do many other publications too, but, instead of an end plate, a tube plate, in the openings of which tube ends are accommodated.

SUMMARY

It is an object of the invention to provide an alternative arrangement which is better suited to specific applications having high mechanical loads.

Some embodiments dispense entirely with a fastening edge, which projects over the entire circumference, on the end plate. The end plate can be designed to be somewhat smaller and lighter with regard to the thickness thereof and the surface extent thereof than in the prior art referred to in the introduction, also because said end plate has to absorb smaller forces since the latter are better distributed.

Some embodiments also provide a projecting edge on the end plate, said edge can also be designed to be smaller and therefore only a partial edge, i.e. not an encircling edge.

A certain fixing of the heat exchanger in the housing and thus a better force distribution can be achieved according to the invention in that a connecting block, which is arranged on the end plate of the stack, for a coolant sits in a housing wall graduation formed in a manner corresponding to a cross section of the connecting block. The at least one wall graduation provides a cross-sectional expansion of the housing. The connecting block is accommodated in the housing space additionally created by the wall graduation. The connecting block extends the fluid apertures in the end plate. It therefore likewise has fluid apertures.

Additional means of fixing the heat exchanger in the housing and therefore an even better force distribution can be provided by profiled rails or the like arranged on the stack or around the stack being fastened, said rails being pushable into further receptacles which are formed on the housing wall and the cross section of which corresponds approximately to the cross section of the rails. The rails can also be provided in the manner of a frame, around the circumference of the stack.

The push-in direction lies approximately transversally with respect to the longitudinal direction of the stack and in the direction of a fluid flow which flows through the fins of the stack in the operating state of the arrangement. A liquid coolant then flows through the pipes of the stack.

The stability of the arrangement is once again substantially increased by the rails sitting in the receptacles. If the housing is a plastic housing which could deform in the event of an appropriate pressure, such a design is particularly important in order to inhibit such deformation.

According to some embodiments of the invention, at least one profiled rail is arranged on the end plate of the stack, and sits in a receptacle which is integrated in a housing wall, wherein a cross section of the receptacle corresponds approximately to a cross section of the rail to provide a particularly stable structure. This structure has a better effect against vibrations and other mechanical loads and, furthermore, is also suitable for avoiding bypass flows between the stack and the housing wall.

In some embodiments, the receptacles are integrated in housing walls of the housing in such a manner that the inside of the housing walls remains approximately flat and the outside of the housing walls has a curvature. This can result in substantially smooth contact between the flat inside and the flat end plate.

The entire length of the rail can be positioned in the receptacle, which likewise has a corresponding length.

In particular, if the application requires the use of a heat exchanger arrangement in a housing having an exceptional overall size, or else replaces a plurality of smaller heat exchanger arrangements and, as a result, is intended to save costs, even greater attention is focused on the stability of the design. This aspect is complied with best by means of the invention.

The invention is described below in an exemplary embodiment which is depicted in the drawings. The description contains further possibly important details of the invention.

BRIEF DESCRIPTION OF THE DRAWINGS

FIG. 3 shows the heat exchanger in an intake pipe.

FIG. 4 shows an enlarged detail from FIG. 3.

FIG. 5 is a perspective view of a heat exchanger according to some aspects of the present invention.

FIG. 6 is a side view of a portion of the embodiment illustrated in FIG. 5.

FIG. 7 is a top view of the portion of the embodiment shown in FIG. 6.

DETAILED DESCRIPTION

In the exemplary embodiments, heat exchanger arrangements are shown and described in an intake pipe 10, which constitutes a housing 10, of an internal combustion engine, wherein the heat exchanger is an indirect charge-air cooler and/or exhaust-gas recirculation cooler. It is therefore possible for "housing" also to be placed at all of the points at which the intake pipe is mentioned in the following text, and this is also true for the situation the other way around.

However, the invention is actually not restricted to such a specific application. The present invention can be used for numerous other applications, in particular those which carry out an exchange of heat between a gas and a liquid, such as, for example, heating heat exchangers, heat exchangers for air conditioning, etc.

However, the present invention is also not intended to be restricted thereto, since, for example, oil coolers which are operated with a liquid coolant also constitute a conceivable application, wherein the tubes, and/or the fins of the stack, are to be appropriately adapted in respect of the cross-sectional dimensioning thereof by a person skilled in the art.

Figure 11:
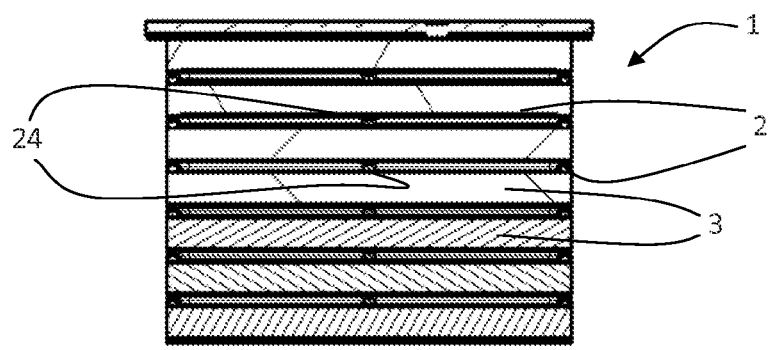
FIG. 11 is a cross-sectional view taken along line A-A of FIG. 10.

The stack 1 forming the heat exchanger consists of flat tubes 2 and fins 3, for example corrugated fins, arranged in an alternating manner. The illustrated flat tubes 2 are each formed from two deformed and connected plates. However, for example, drawn flat tubes 2 are also the most highly suitable (FIG. 11).

Figure 17:
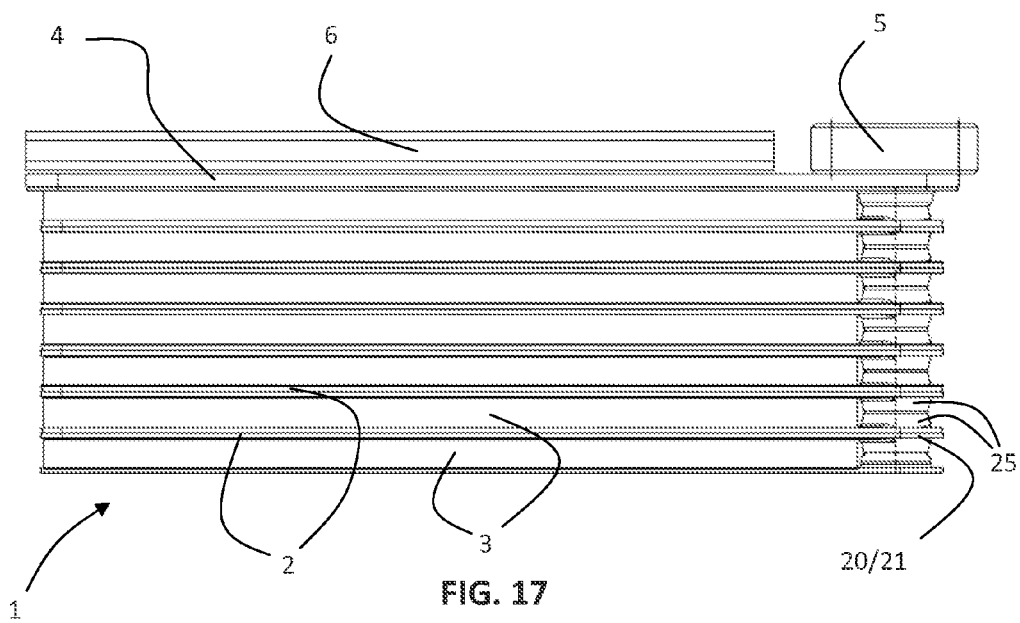
FIG. 17 is a side view of a portion of a heat exchanger according to some embodiments of the present invention.

Two parallel ducts, an inflow duct 20 and an outflow duct 21 extend vertically through the stack 1. The two ducts 20, 21 (FIG. 2) are formed from two openings in the wide sides of the flat tubes 2, said openings being streamlined with each other in the stack 1. The openings mentioned can have collar-like borders 25 (for example FIGS. 5 and 17). A collar-like border 25 in the wide sides of the one flat tube 2 is connected in a fluid-tight manner to just such a collar-like border 25 in the wide sides of the adjacent flat tube 2, etc. In the stack 1, the connected collar-like borders 25 span the height of the intermediate spaces, which are filled with the corrugated fins 3, between the flat tubes 2 and therefore ensure the separation between compressed charge air LL which is to be cooled and which flows through the corrugated fins 3, and a liquid coolant which can flow into the flat tubes 2 via the inflow duct 20 and via the connected collar-like borders 25 and can flow out in the same manner via the outflow duct 21. The flat tubes 2 have a flow separation 24 which lies between the ducts 20, 21 and runs in the longitudinal direction of the flat tubes 2 (FIG. 11) and ends shortly before the other end of the flat tubes 2, and therefore, in the exemplary embodiment, the flow passes in a U-shaped manner through all of the flat tubes 2, which is indicated in FIG. 3.

An end plate 4 is located on top of the stack 1. On the end plate 4, at one end thereof, which end corresponds approximately also to the one end of the flat tubes 2, there is a connecting block 5 which can be brazed on the end plate, so that the entire stack 1 preferably constitutes a brazed structure. In the exemplary embodiments, the connecting block 5 sits exactly over the described ducts 20, 21. The fluid apertures or media connecting ducts formed in the connecting block 5 are fluidly connected to the fluid apertures in the end plate 4 and the ducts 20, 21 of the heat exchanger. The ducts 20, 21 of the heat exchanger are formed by means of the streamlined openings in the wide sides of the flat tubes 2 (see above). The connecting block 5 in the exemplary embodiment extends transversely over the entire depth of the stack 1.

Figure 1:
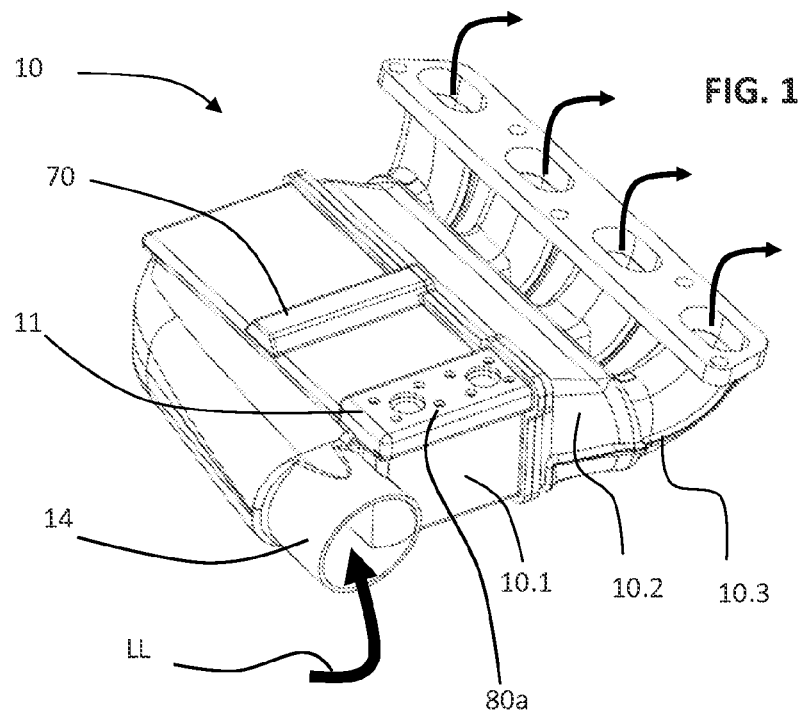
FIG. 1 is a perspective view of a heat exchanger arrangement according to some embodiments of the present invention.

The illustrated intake pipe 10 is a plastic intake pipe which, in the exemplary embodiments includes three parts 10.1, 10.2, 10.3 (FIG. 1). The intake pipe 10 is produced in the form of an injection molded product. The first part 10.1 has a connector 14 for the entering hot air or charge air LL and that intake pipe section which forms the direct housing 10 for the heat exchanger stack 1. The first part 10.1 can be considered to be a main part. In the exemplary embodiment, the air connector 14 is arranged laterally. The cross section thereof is expanded toward four intake pipe sides, wherein the shape of said illustrated connector merges from approximately round into approximately rectangular.

A two-part configuration has been provided, with four outlet openings in the exemplary embodiment, on the outlet side of the intake pipe 10 for cold air, said outlet side facing the internal combustion engine (not shown). Each outlet opening is assigned to a cylinder of the internal combustion engine. The second part 10.2 has a connecting flange in order to connect to the first part 10.1, for example by means of hot gas welding, after the stack has been installed in the main part, which has just such a connecting flange. The third part 10.3 completes the intake pipe 10 and can be connected to the second part 10.2 likewise by means of hot gas welding.

As FIG. 1 shows particularly clearly, the main part 10.1 of the intake pipe 10 or of the housing has a wall graduation 11 which significantly expands the cross section of the intake pipe 10. The expanded cross section, which is adjacent in the exemplary embodiment to a corner region of the intake pipe 10, is of such a size that the connecting block 5 can sit exactly therein. The cross-section expansion 11 or the wall graduation therefore extends into the intake pipe 10 over a depth which corresponds approximately to the depth of the stack 1 in order to be able completely to accommodate the connecting block 5 located on the end plate 4 in said intake pipe.

Connecting openings 22, 23 which approximately correspond to the fluid apertures in the connecting block 5 are arranged in the cross-section-expanding wall graduation 11 (see FIG. 3).

Other openings 80a, 80b are also located in the connecting block 5 and in the wall graduation 11 for fastening purposes. A seal 50 can also be present between the upper side of the connecting block 5 and the inside of the intake pipe 10, in the cross-section expanding region. For the fastening, for example, screws can be guided through the openings 80a into the connecting block 5. The inside of the intake pipe 10 here is pressed fixedly on to the seal 50. Furthermore, a particularly high degree of stability of the heat exchanger arrangement in the plastic intake pipe is achieved in interaction with rails 6 and receptacles 7, which are described further below.

Figure 2:
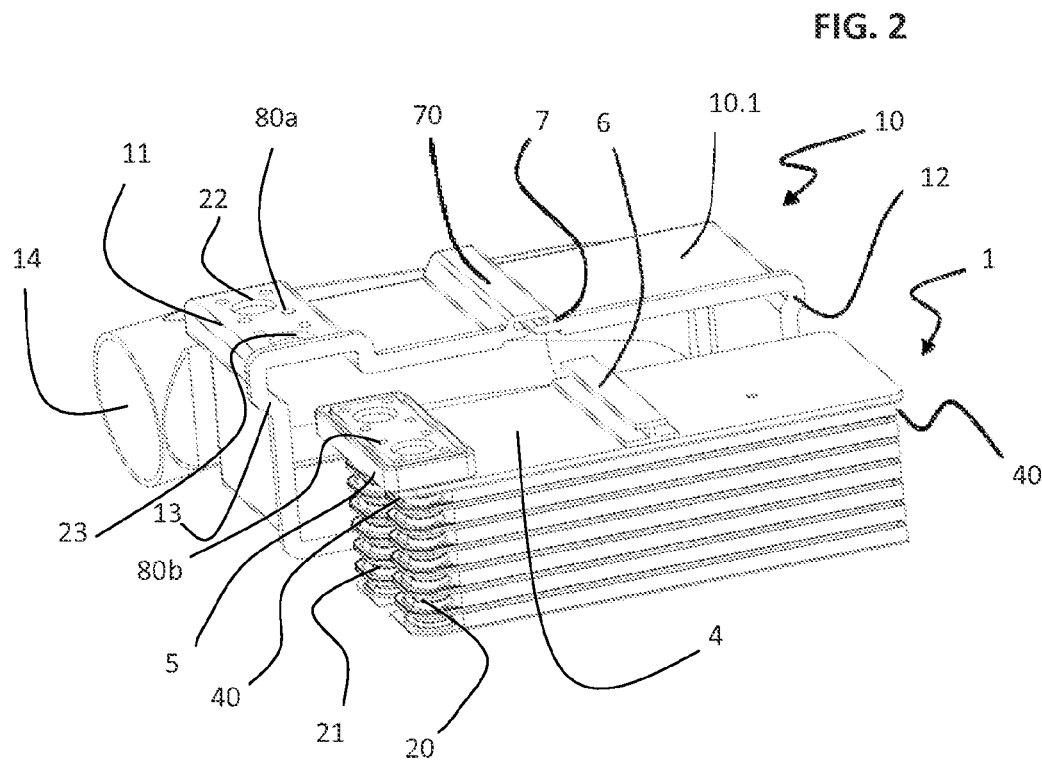
FIG. 2 is an exploded view of part of FIG. 1.
Figure 8:
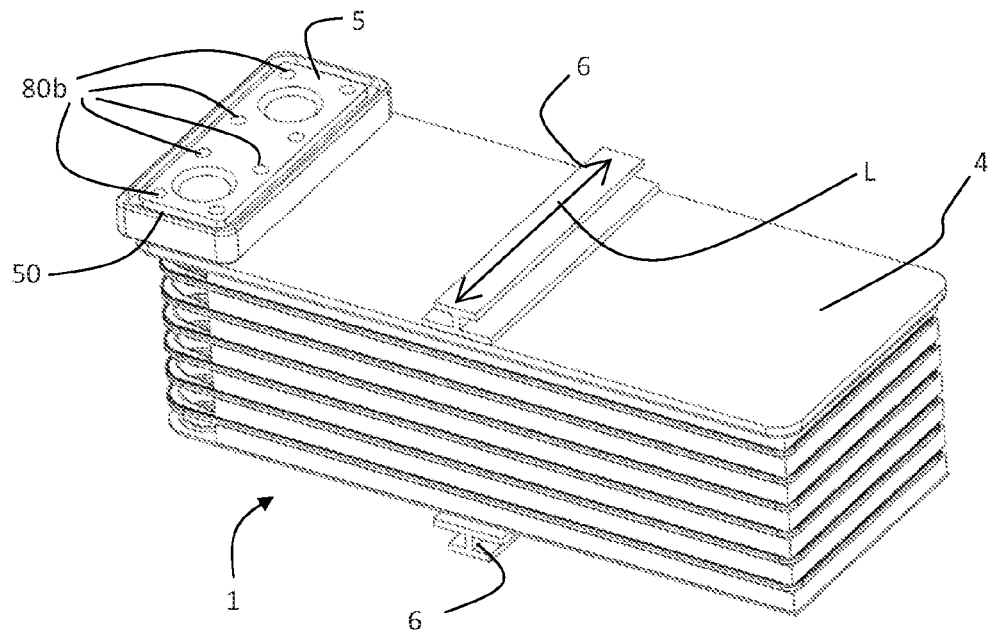
FIG. 8 is a perspective view of the portion of the embodiment shown in FIGS. 6-7.
Figure 9:
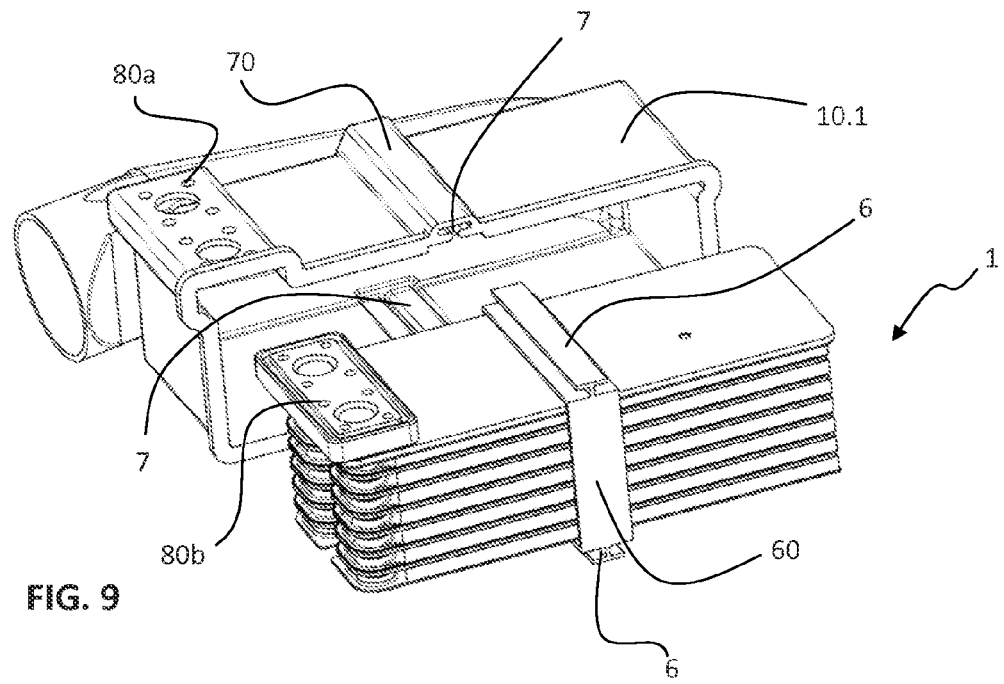
FIG. 9 is an exploded perspective view of a heat exchanger according to some aspects of the present invention.
Figure 10:
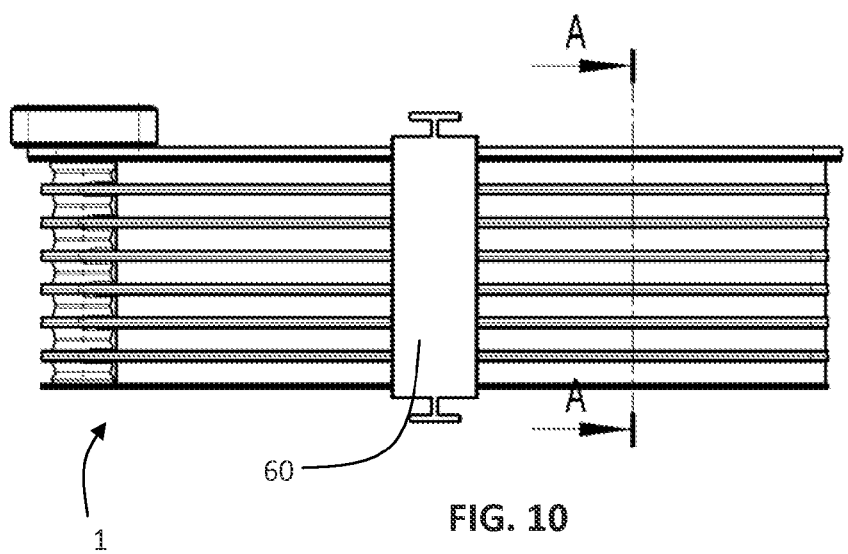
FIG. 10 is a side view of a portion of the embodiment illustrated in FIG. 9.

As is furthermore apparent from FIG. 2, the end plate 4 has, on the side of the connecting block 5, a projecting length 40 over the stack 1, said projecting length, together with an edge piece of the connecting block 5, engaging in a channel 13 formed in the intake pipe wall. This projecting length 40 could optionally also be omitted. In some embodiments, it suffices for the connecting block 5 alone to have a projecting length. The channel 13 is arranged directly adjacent to the wall graduation 11 and is similar thereto. In this exemplary embodiment, the channel 13 forms, together with the wall graduation 11, the cross-section expansion mentioned in a corner region of the intake pipe 10 and also enlarges said cross-section expansion considerably.

In embodiments which are not shown, the wall graduation 11 with the cross-section expansion is located a good distance away from a corner region.

The end plate 4 has, at the end thereof opposite the connecting block 5, a further projecting length 40 over the stack 1, said projecting length engaging in another channel 12 formed in the opposite intake pipe wall (FIGS. 2 and 3).

As the figures show, the two channels 12, 13 are formed similarly to the wall graduation 11. The wall graduation 11 is arranged in a longitudinal wall of the intake pipe 10 or of the main part 10.1 of the intake pipe, and the channels 12, 13 are located in opposite transverse walls of the main part 10.1.

A further end plate 4 can be located opposite the described end plate 4—on the lower side of the stack in the illustrations, which further end plate can be designed to be significantly weaker than the described end plate 4, since said further end plate is not necessary per se for force absorption and distributing forces. Accordingly, the further end plate can also be omitted.

The profiled rails 6 are fastened to the stack 1 at the top and optionally the bottom, i.e. to the end plates 4 of the stack 1, said rails sitting approximately over an entire length L thereof in receptacles 7 which are formed in the intake pipe 10 and the cross section of which corresponds approximately to the cross section of the rails 6. In this exemplary embodiment, the length L of the rail 6 approximately corresponds to the depth of the stack 1. The length could readily also be shorter or the length could also be somewhat longer. The rails 6 can be brazed individually onto the stack 1 and oriented in the longitudinal direction or transverse direction of the stack 1. The cross sections shown are, for example, I-shaped or L-shaped. In the exemplary embodiments, the two limbs of the I-shaped profile differ in length. The longer limb lies on the end plate 4.

FIGS. 1-4 show only a single rail 6.

FIGS. 5-8 show two rails 6, one on the upper end plate 4 and another on the lower end plate 4, and corresponding receptacles 7 in the adjacent intake pipe walls. The rail 6 sits approximately over the entire length L thereof in the receptacle 7.

Figure 18:
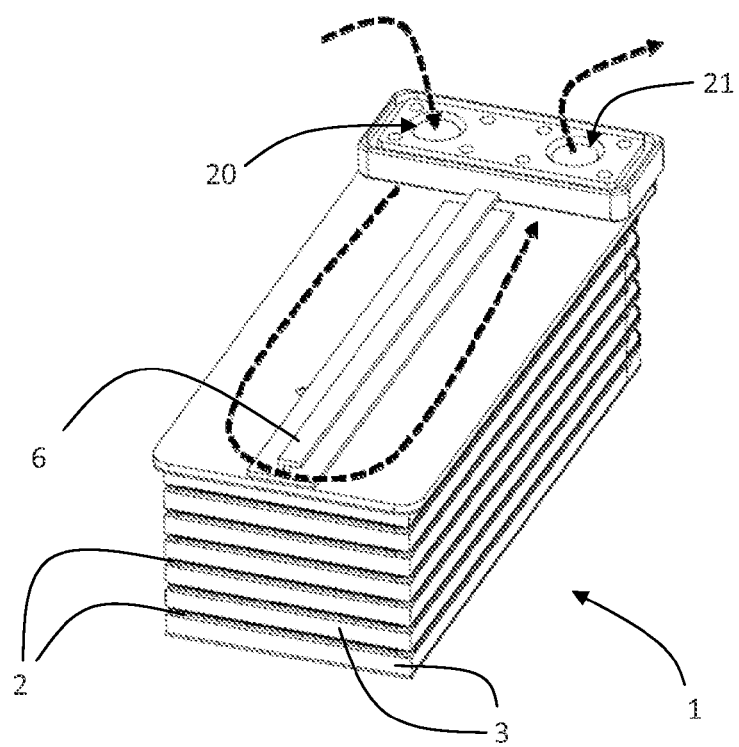
FIG. 18 is a perspective view of the portion of the heat exchanger shown in FIG. 17.
Figure 19:
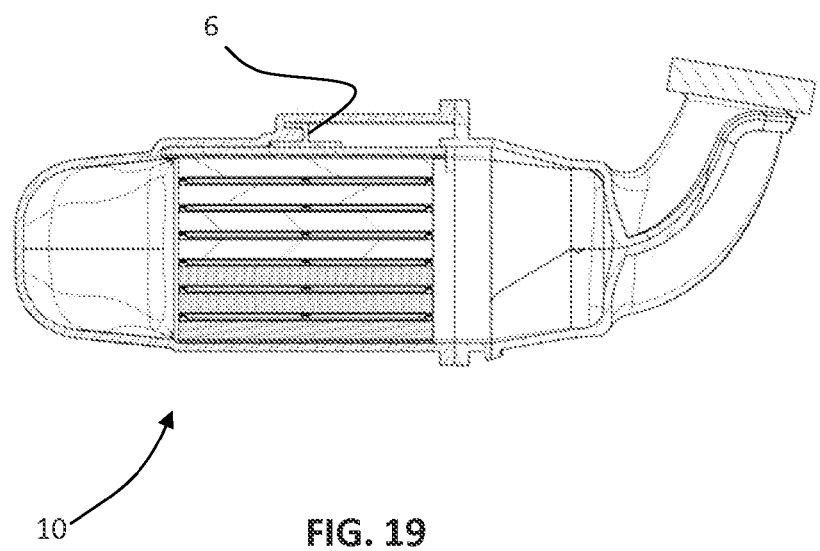
FIG. 19 is a cross-sectional view of the heat exchanger of FIGS. 17-18 positioned in a housing.

In the embodiments with I profiles, the rails 6 are arranged in the push-in direction of the stack into the intake pipe 10, the transverse direction of the stack 1 in the exemplary embodiment. The L-shaped profile can be arranged, by contrast, in the longitudinal direction of the stack 1, i.e. transversely with respect to the push-in direction, in the exemplary embodiments according to FIGS. 17-19.

It is also possible to form a four-cornered frame 60 from the described rails 6 and from non-profiled rails, said frame being pushed over the circumference of the brazed stack 1 without being specially fastened thereto (FIGS. 9-13). In these cases, the rails can also be composed of a different material, possibly also from plastic. The use of other heat-resistant materials is also conceivable.

Figure 12:
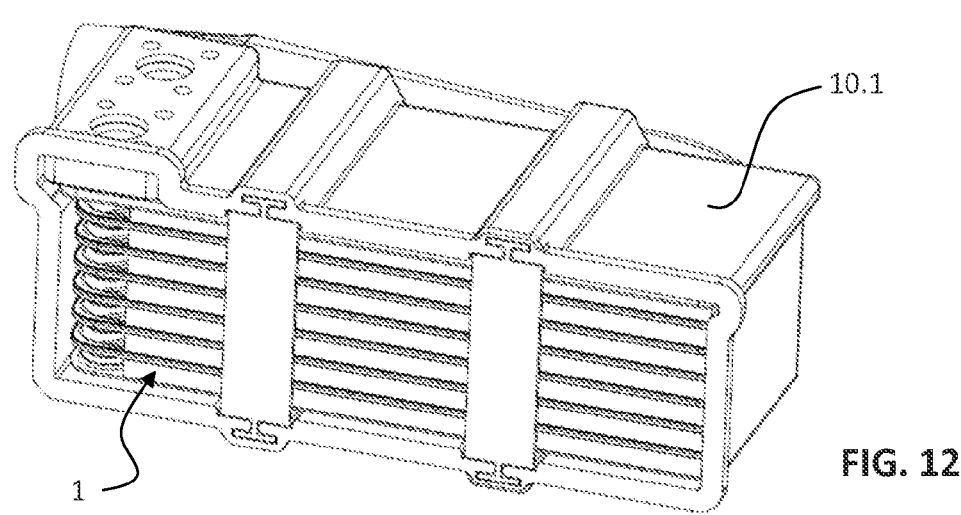
FIG. 12 is a perspective view of a heat exchanger according to some aspects of the present invention.
Figure 13:
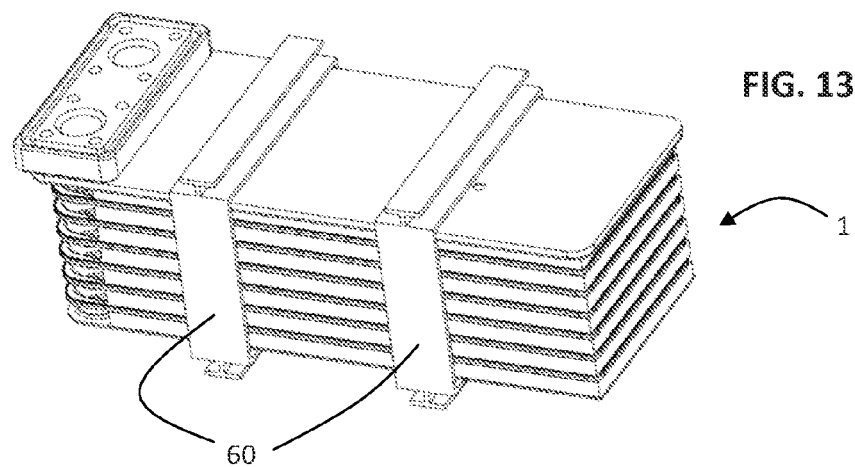
FIG. 13 is a perspective view of a portion of the embodiment shown in FIG. 12.
Figure 14:
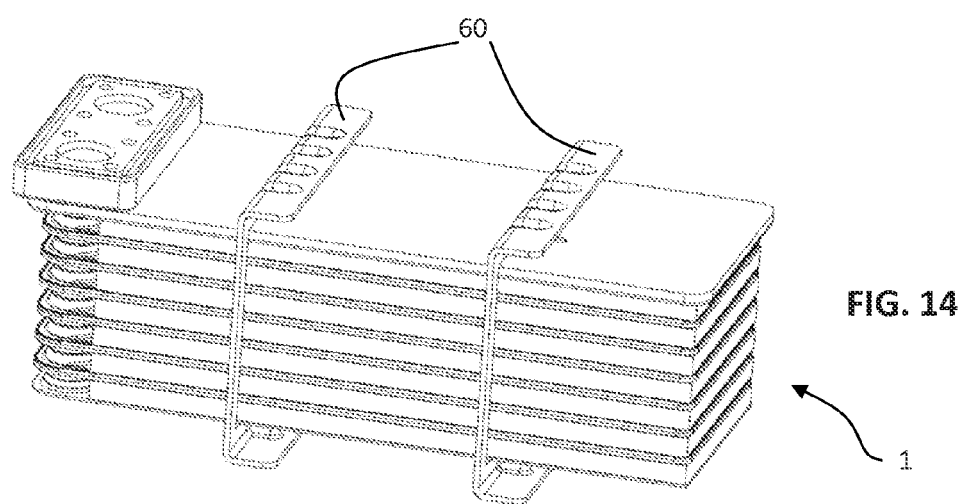
FIG. 14 is a perspective view of a portion of a heat exchanger according to some embodiments of the present invention.
Figure 15:
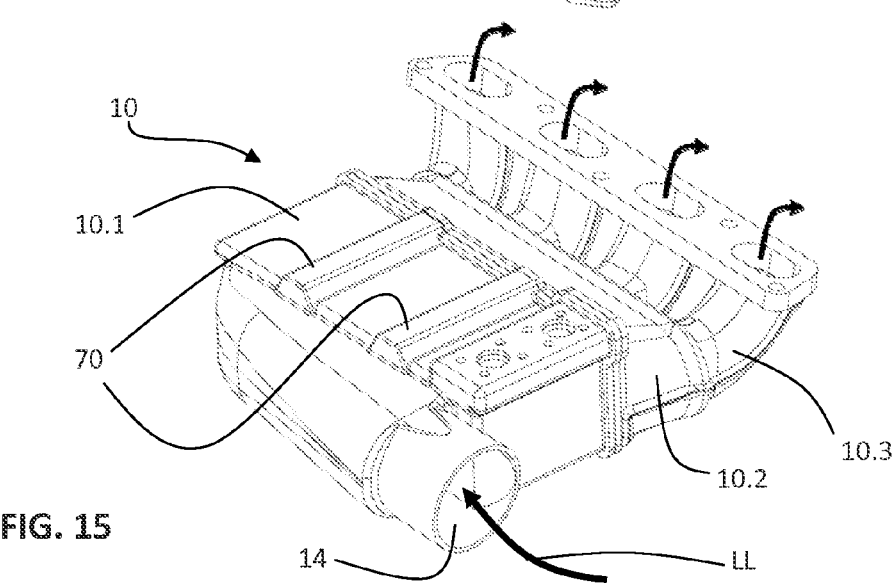
FIG. 15 is a perspective view of a heat exchanger according to some embodiments of the present invention.
Figure 16:
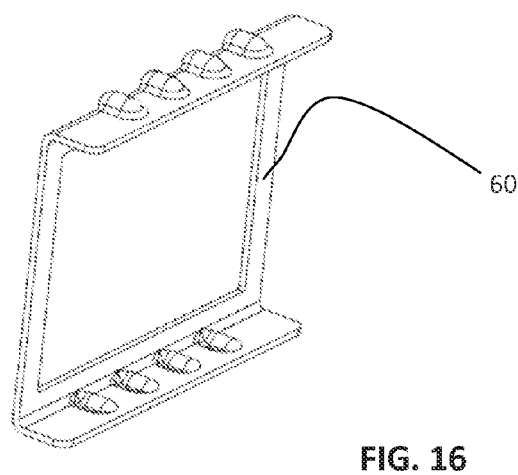
FIG. 16 is a perspective view of a portion of the heat exchanger of FIG. 15.

FIGS. 12-14 show exemplary embodiments having two frames 60, which are distinguished by particularly high stability.

The receptacles 7 have been designed to be integrated in the walls, specifically in such a manner that, when the rails 6 sit in the receptacles 7, there are no gaps, through which power-reducing bypasses could flow, between the stack 1 or between the end plates 4 thereof and the housing walls, which is very clearly shown by FIGS. 3-5, for example. The receptacles 7 have been integrated in such a manner that the intake pipe wall remains flat on the inside, which serves to avoid bypasses. The necessary space for the receptacles 7 then leads outwards to a corresponding curvature 70 of the wall. (For example, FIGS. 2, 3 and 5).

A further advantage of the use of the described rails 6 over other known solutions consists in that the standard elements of the stack 1, i.e. the fins 3 and the tubes 2, do not have to be changed, which simplifies the production thereof. The separation of the flow 24 in the flat tubes 2 as discussed above can also be seen in FIG. 11.

The hot gas welding connection to the connecting flanges of the main part and of the second part, which hot gas welding connection has already been discussed by way of example, then takes place, after the described installation of the stack in the main part is finished.

Various features and advantages of the invention are set forth in the following claims.

What is claimed is:
1. A heat exchanger assembly comprising:
a housing forming an air intake pipe including an intake pipe opening having at least one cross-section-expanding wall graduation that includes at least one connecting opening, the wall graduation being defined by a plurality of walls forming an inside periphery of the wall graduation, wherein the at least one connecting opening extends from the wall graduation through at least one of the plurality of walls;
at least one stack positioned within the housing including tubes that extend in a longitudinal direction and at least one fluid duct that extends at least partially through the stack;
an end plate connected to the stack and having at least one fluid passage that is fluidly connected to the at least one fluid duct, the end plate including an end plate top surface; and
an integral connecting block attached to the end plate top surface and positioned at least partially within the wall graduation of the housing, connected fluidly to the at least one fluid passage and the at least one connecting opening, and having a length in the longitudinal direction, a width in the transverse direction, and a height, the integral connecting block including,
an outer surface, and
at least one round media connecting duct that extends from the outer surface toward the at least one fluid passage and that includes a first diameter,
wherein one of a front side surface or a back side surface of the outer surface of the integral connecting block is defined by a middle portion and a plurality of peripheral portions that follow the inside periphery of the wall graduation, the plurality of peripheral portions including a top peripheral portion and side peripheral por- tions, the side peripheral portions being opposite of each other in the longitudinal direction, wherein the middle portion extends across the front side surface in the longitudinal direction to the entirety of each of the side peripheral portions and is in-line in the transverse direction with at least a portion of the at least one round media connecting duct, wherein the integral connecting block is located at one of the longitudinal ends of the end plate top surface and extends partially over the end plate top surface such that a portion of the end plate top surface is below the wall graduation and a portion of the end plate top surface is adjacent to and faces an interior surface of the housing, wherein the stack, the end plate, and the integral connecting block are all inserted into the intake pipe opening after being assembled, and wherein the intake pipe opening is partially open to air flow therethrough and is partially blocked by the integral connecting block and the end plate.

2. A heat exchanger assembly according to claim 1, wherein the front side surface is a solid surface that extends from the entirety of one of the side peripheral portions to the entirety of the other one of the side peripheral portions.

3. A heat exchanger assembly according to claim 1, wherein the outer surface of the integral connecting block includes an upper side surface, and the upper side surface is substantially planar.

4. A heat exchanger assembly according to claim 1, wherein the at least one round media connecting duct has a media connecting duct top edge wherein at least a portion of each of the opposite sides in the longitudinal direction of the media connecting duct top edge intersect with the outer surface in the same approximate plane.

5. A heat exchanger assembly according to claim 1, wherein the at least one connecting opening has major diameter that is at least as large as the first diameter of the at least one round media connecting duct.

6. A heat exchanger assembly according to claim 1, wherein the at least one connecting opening is round and has a second diameter that is in-line with the first diameter of the at least one round media connecting duct.

7. A heat exchanger assembly according to claim 1, wherein a seal is disposed on the outer surface at least partially between the connecting block and a portion of the inside periphery of the wall graduation.

8. A heat exchanger assembly according to claim 7, wherein the seal is spaced apart from the at least one round media connecting duct.

9. A heat exchanger assembly according to claim 1, wherein the at least one round media connecting duct has a circular media connecting duct top edge that is disposed adjacent to a connecting opening bottom edge of the at least one connecting opening.

10. A heat exchanger assembly according to claim 9, wherein the at least one connecting opening is two connecting openings and the at least one round media connecting duct is two round media connecting ducts and each of the round media connecting ducts has a circular media connecting duct top edge and each of the connecting openings has a connecting opening bottom edge, wherein the each of the circular media connecting duct top edges is disposed adjacent to the each of the connecting opening bottom edges.

11. A heat exchanger assembly according to claim 1, wherein the housing includes a housing fastener opening that extends from a first space outside of the housing to a second space inside of the housing and wherein a fastener extends from the first space through the housing fastener opening to the second space and into the connecting block.

12. A heat exchanger assembly according to claim 11, wherein the fastener is disposed adjacent to a seal located on the connecting block wherein the seal is spaced apart from the at least one round media connecting duct.

13. A heat exchanger assembly comprising:
a housing having a first housing wall defining a peripheral portion of the housing, the first housing wall including a first section, a second section, and a first receptacle located between the first section and the second section, the first receptacle including a first receptacle portion and a second receptacle portion;
a stack including tubes extending in a longitudinal direction;
an end plate positioned on a first side of the stack; and
a first profiled rail including a first rail portion and a second rail portion, which is located on the end plate and spaced apart from the first rail portion, wherein the first section and the second section each have inner surfaces that are at least partially in a first plane, wherein the first receptacle portion is located on a distal side of the first plane and the second receptacle portion is at least partially located on the distal side of the first plane, wherein the stack and the first profiled rail are received in the housing such that the first rail portion is received within the first receptacle portion and the second rail portion is received within the second receptacle portion, and
wherein at least part of both of the inner surfaces of the first and the second sections are located flush to the end plate.

14. A heat exchanger assembly according to claim 13, wherein the second rail portion has a second rail portion height and the second receptacle portion has a second receptacle portion height that is approximately the same as the second rail portion height such that the end plate is disposed adjacent to the housing wall.

15. A heat exchanger assembly according to claim 13, wherein the first profiled rail has a first end positioned approximately at a longitudinal side of the stack, the first profiled rail extending in a transverse direction along the end plate.

16. A heat exchanger assembly according to claim 13, wherein the housing includes a second housing wall opposite of the first housing wall, and the second housing wall includes a second receptacle having a third receptacle portion and a fourth receptacle potion, and wherein a second profiled rail is arranged on a second side of the stack opposite the first side, and the second profiled rail includes a third rail portion received within the third receptacle portion and a fourth rail portion separated from the third rail portion and received within the fourth receptacle portion.

17. A heat exchanger assembly according to claim 16, wherein a first frame side connects a first end of the second rail portion of the first profiled rail to a first end of the fourth rail portion of the second profiled rail and a second frame side connects a second end of the second rail portion of the first profiled rail to a second end of the fourth rail portion of the second profiled rail.

18. An intake pipe assembly for an internal combustion engine comprising:
a plastic housing including a plurality of sections to form an air intake pipe, at least one of the plurality of sections including a plurality of integrated walls formed together to define a front opening through which air flows, at least one of the plurality of integrated walls includes a wall graduation expanding the front opening and defining a wall graduation opening portion of the front opening;

a stack including tubes extending in a longitudinal direction received within the front opening;

an end plate positioned on a first side of the stack and having a first projected end; and an integral connecting block received at least partially within the wall graduation having a length in the longitudinal direction, a width in a transverse direction, and a height, wherein a front side of the connecting block extends across the wall graduation substantially filling the wall graduation opening portion.

19. The intake pipe assembly for an internal combustion engine according to claim 18, wherein the plurality of integrated walls includes a first channel at an end opposite of the wall graduation, and wherein the first projected end of the end plate is received within the first channel.

20. An intake pipe assembly for an internal combustion engine according to claim 19, wherein the plurality of integrated walls includes a second channel located adjacent to the wall graduation, and wherein the end plate includes a second projected end adjacent to the connecting block and received within the second channel, and wherein the first channel expands the front opening at a first side wall of the plurality of integrated walls and the second side wall expands the front opening at a second side wall of the plurality of integrated walls opposite the first side wall.

21. An intake pipe assembly for an internal combustion engine according to claim 20, wherein the plurality of integrated walls also define a planar front peripheral surface that surrounds the front opening, and wherein the front side of the connecting block is approximately co-planar with the planar front peripheral surface.

22. An intake pipe assembly for an internal combustion engine according to claim 18, wherein the integral connecting block and a first profiled rail extend transversely with respect to the stack and are substantially parallel to each other.

23. An intake pipe assembly for an internal combustion engine according to claim 20, wherein the stack includes a stack end in the longitudinal direction and wherein the integral connecting block extends beyond the stack end in the longitudinal direction.

24. The intake pipe assembly for an internal combustion engine according to claim 18, wherein the plurality of sections includes a first part and a second part, both of which through air flows, and wherein the front opening is located in the first part and the second part includes a second part opening that mates with the front opening.

25. The intake pipe assembly for an internal combustion engine according to claim 18, wherein the length, width, and height of the integral connecting block fill a length, a width, and a height of the wall graduation.

26. The intake pipe assembly for an internal combustion engine according to claim 18, wherein the end plate includes an end plate top surface onto which the integral connecting block is attached and onto which a first profiled rail is attached spaced apart from the integral connecting block in the longitudinal direction, both the integral connecting block and the first profiled rail extending across the end plate in the transverse direction, and wherein the end plate top surface extends in the transverse direction within the air intake pipe along at least one of the plurality of integrated walls.

\* \* \* \* \*